United States Patent [19]

Lähdemäki

[11] Patent Number: 5,396,488
[45] Date of Patent: Mar. 7, 1995

[54] METHOD FOR NON-LINEAR SIGNAL PROCESSING IN AN ECHO CANCELLER

[75] Inventor: Heimo Lähdemäki, Pirkkala, Finland

[73] Assignee: Nokia Telecommunications Oy, Espoo, Finland

[21] Appl. No.: 81,324

[22] PCT Filed: Oct. 28, 1992

[86] PCT No.: PCT/FI92/00287
§ 371 Date: Jun. 23, 1993
§ 102(e) Date: Jun. 23, 1993

[87] PCT Pub. No.: WO91/20149
PCT Pub. Date: Dec. 26, 1991

[30] Foreign Application Priority Data
Nov. 4, 1991 [FI] Finland ................... 915200

[51] Int. Cl.⁶ .................. H04B 3/20; H04M 9/08
[52] U.S. Cl. ......................... 370/32.1; 379/409
[58] Field of Search .......... 370/6.24, 32, 32.1; 379/388, 390, 406, 409, 410, 411

[56] References Cited
U.S. PATENT DOCUMENTS

| | | | |
|---|---|---|---|
| 3,894,200 | 7/1975 | Campenella et al. | 379/411 |
| 4,213,014 | 7/1980 | Luder | 379/406 |
| 4,368,360 | 1/1983 | Sato et al. | 379/406 |
| 4,645,883 | 2/1987 | Horna et al. | 379/406 |
| 4,979,163 | 12/1990 | Erving et al. | 370/32.1 |
| 5,075,687 | 12/1991 | Chen et al. | 370/32.1 |
| 5,157,653 | 10/1992 | Genter | 370/32.1 |
| 5,193,112 | 3/1993 | Sano | 379/410 |
| 5,274,705 | 12/1993 | Younce et al. | 379/410 |

FOREIGN PATENT DOCUMENTS

| | | | |
|---|---|---|---|
| 0449370 | 3/1991 | European Pat. Off. | H03K 6/04 |
| 2080073 | 1/1982 | United Kingdom | H03K 5/153 |
| 9120149 | 12/1991 | WIPO . | |

Primary Examiner—Alpus H. Hsu
Attorney, Agent, or Firm—Cushman Darby & Cushman

[57] ABSTRACT

Non-linear signal processing is provided in an echo canceller, in which the level of the signals passing through the echo canceller from the near end to the far end is attenuated to a predetermined blocking level, when the level of the near end signals is lower than a given threshold level. The level of the signal passing through the echo canceller from the near end to the far end is raised in a ramp-like manner from the blocking level back to the normal level ($T_{SUP}$), when the level ($L_{Sin}$) of the near end signals again exceeds the given threshold level or in a double talk situation.

14 Claims, 2 Drawing Sheets

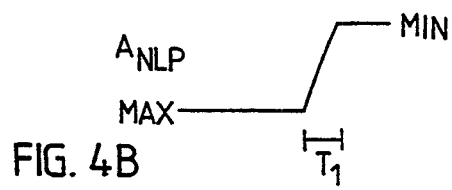
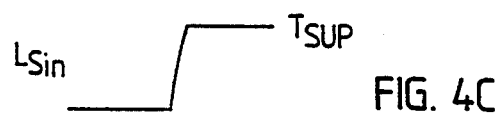
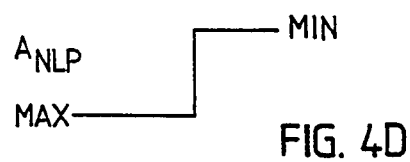
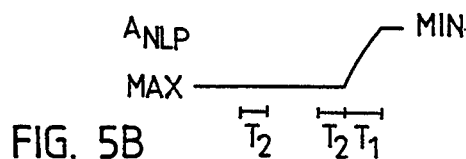
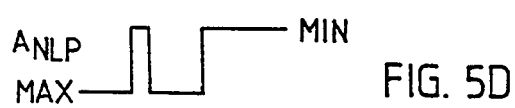
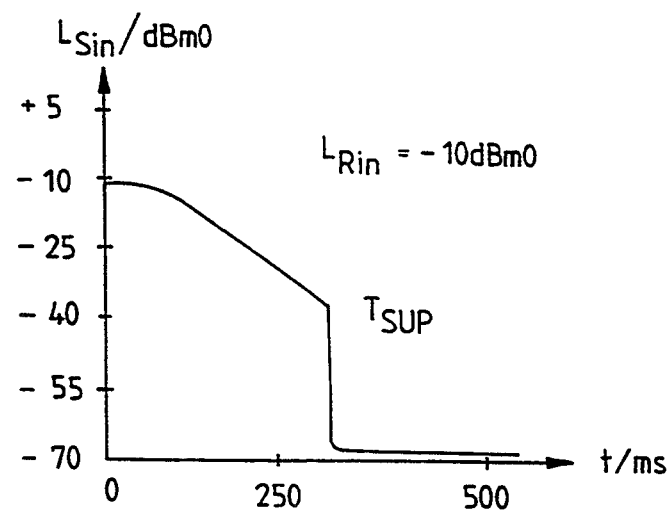
FIG. 6

METHOD FOR NON-LINEAR SIGNAL PROCESSING IN AN ECHO CANCELLER

FIELD OF THE INVENTION

The invention relates to a method for non-linear signal processing in an echo canceller, in which method the level of the signals passing through the echo canceller from the first end of a transmission connection to the second end is attenuated to a predetermined blocking level, when the level of the first end signals entering the echo canceller is lower than a given threshold level, and the level of the signals passing through the echo canceller from the first end to the second end is raised back to the normal unattenuated level, when the level of the first end signals entering the echo canceller again exceeds the given threshold level or when a double talk situation is detected.

BACKGROUND OF THE INVENTION

End-to-end connections of a data transmission system, such as a telephone network, often show long transit time delays, in consequence of which echo is observed, for instance in the case of normal speech, when a signal is reflected from the far end of a connection back to the talker. An echo canceller is an analog or digital device for processing a signal, such as a speech signal, which device is used for reducing echo by subtracting estimated echo from the echo (signal) occurring in the connection.

An echo canceller may comprise a non-linear processor, which only allows a passage of signals exceeding a given threshold level and blocks a passage of low-level signals, as is illustrated by a characteristic curve in FIG. 2. Non-linear processing is used for lowering the level of a residual echo caused by an incomplete echo cancellation. This results in a better overall attenuation (total attenuation consisting of echo path attenuation, echo cancellation attenuation and non-linear processing).

Incomplete echo cancellation is possible if considerable non-linear distortion occurs on the echo path (many PCM coders on the echo path, for instance). Combined quantized distortion may prevent the echo canceller from producing an echo signal with sufficiently low level at the output port of the echo canceller. Therefore, it is often advantageous to use a non-linear processor, though not absolutely necessary.

In an ideal case, a non-linear processor does not cause distortion in the speech signal coming from the near end, i.e. from the direction of the echo path. In practical applications, however, distortion may occur, in which situation it is to be recommended to shunt the non-linear processor during double talk (both ends are talking) and near end talk conditions.

The threshold level used in a non-linear processor for signal blocking decisions may be either fixed or adaptive. A fixed threshold level may be determined on the basis of the achieved echo cancellation, speech levels and line conditions. As a general rule, the threshold level shall be set about a few dB higher than the peak levels of the residual echo occurring when the echo cancellation is in operation. A good compromise can be achieved by employing a threshold level adaptive to the line conditions and speech levels. By using a high threshold level an undesired exceeding of the threshold level caused by high-level residual echo is prevented, and by using a low threshold level a distortion of speech during interruptions in speech is reduced.

SUMMARY OF THE INVENTION

The object of the invention is to provide a method for signal processing by means of a non-linear processor in such a manner that the resulting interference will be minimized.

This is achieved by a method characterized in that the level of the signals passing through the echo canceller is raised ramp-like from the blocking level to the given threshold level during a predetermined time.

In the preferred embodiment of the invention, the non-linear processing is terminated by raising the signal level ramp-like, preferably linearly, from the blocking level to the threshold level instead of affecting the level change as a rapid step. By means of such a "smoothening", the little audible stir caused by a quick change in the signal level can be avoided in the telephone channel.

In another embodiment of the invention, a ramp-like raise of the signal level does not start until after a given guard period from the moment when a near end signal exceeds the threshold level. By using the guard period, at least two significant advantages are achieved. Firstly, the guard period is used in order that a signal, still propagating on the echo path, will have time to enter the echo canceller before the termination of the non-linear processing and thereby will not be passed through the echo canceller to the far end. Secondly, an echo path model created by the echo canceller especially in a noisy signal environment tends to diverge a little at the end stage of the far end speech, when the signal level of the far end is falling, and this would also cause echo at the far end at the termination of the non-linear processing, if there were no guard period. Echo would occur in this case after a pause in the far end speech, because due to divergence, the echo path model would not be accurate enough any longer.

In a case of double talk situation, non-linear processing shall be switched off more quickly, and therefore, no guard period is used when double talk is observed, but the non-linear processing is switched off immediately by ramp-like termination only.

BRIEF DESCRIPTION OF THE DRAWINGS

The invention will be explained in the following in greater detail by means of embodiments with reference to the attached drawings, in which:

FIGS. 4A–B and 4C–D illustrate a switching off of the non-linear processor by using a ramp according to the invention and without it, respectively, FIGS. 5A–B and 5C–D illustrate a switching/off of the non-linear processor by using a guard period according to the invention and without it, and FIG. 6 is a graph illustrating a switching on of the non-linear processor.

DETAILED DESCRIPTION OF THE INVENTION

Figure 1:
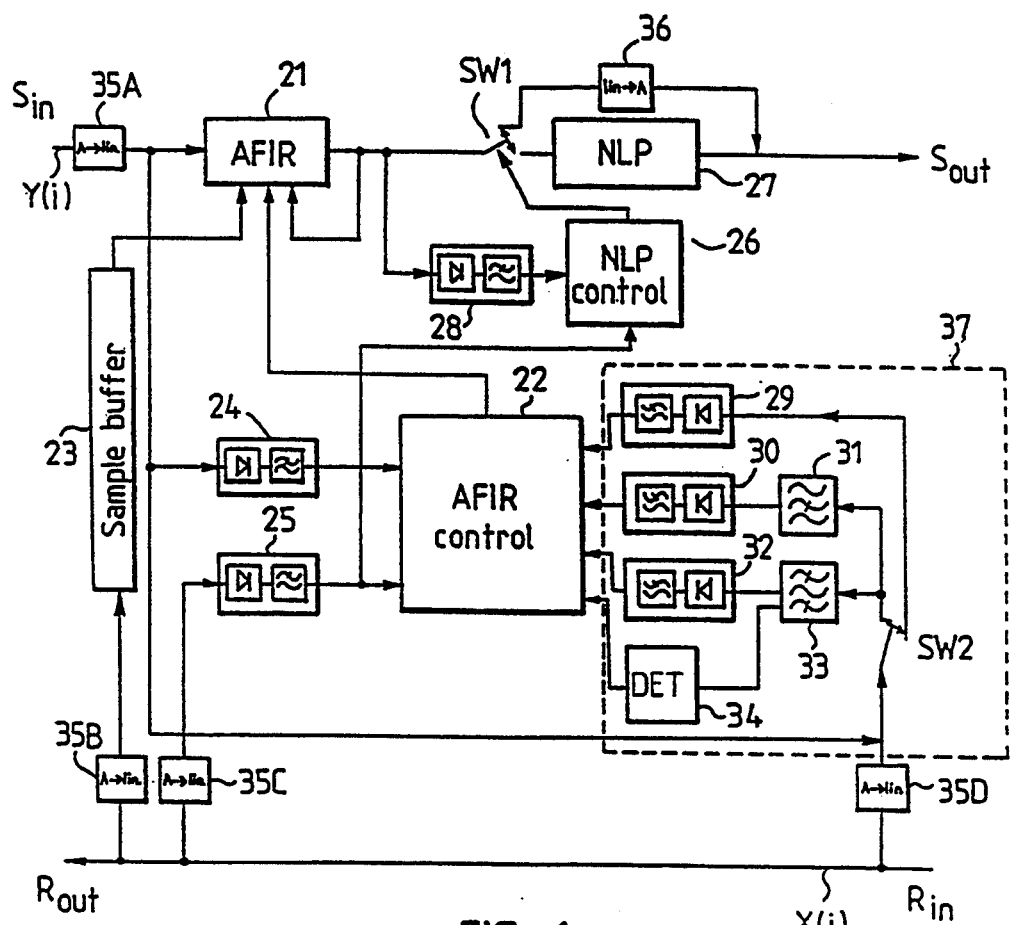
FIG. 1 shows a block diagram of an echo canceller according to the invention.

FIG. 1 shows a digital echo canceller, to which the invention can be applied. The echo canceller comprises an input port $S_{in}$ and an output port $S_{out}$ of a digital signal to be transmitted as well as an input port $R_{in}$ and an output port $R_{out}$ of a digital signal to be received. The echo canceller shall eliminate the echo only in the transmission direction, in this application called far end (the echo canceller can alternatively be constructed to eliminate the echo in the receiving direction). The opposite direction is called near end. The ports $S_{in}$ and $R_{out}$ are connected to the transmission path of the near end and the ports $S_{out}$ and $R_{in}$ to the transmission path of the far end. The echo to be cancelled is a component r(i) of a speech signal x(i) received at the port $R_{in}$ from the far end and transmitted forward over the port $R_{out}$ to the near end (to the echo path), which component is reflected from the near end.

A transmission signal y(i) of the near end is linearized by an A-law converter 35A, processed by means of an adaptive FIR filter 21 and finally applied to a change-over switch SW1. The switch SW1 controlled by a control unit 26 connects the output of the filter 21 either over a non-linear processor 27 or an A-law converter 36 to the output port $S_{out}$ of the echo canceller.

The adaptive digital filter 21 is for instance a digital transversal filter, which models an impulse response of the echo path. A control unit 22 controls the operation, adaptation and updating of the adaptive filter 21 on the basis of the levels of the signals y(i) and x(i), which levels are obtained by means of level detectors 24 and 25, respectively, and on the basis of a disable tone detection, which is performed by means of a disable tone detection circuitry 37.

The signal x(i) is linearized by A-law converters 35B, 35C and 35D, before being applied to a sample buffer 23, the level detector 25 and the disable tone detection circuitry 37, respectively. Samples taken from the signal x(i) are stored in the sample buffer 23, from which they are applied, if needed, to the filter 21 for the calculation of a correlation between them and samples taken from the signal y(i). Coefficients $a_k$ of the filter 21 are updated on the basis of this correlation.

Figure 2:
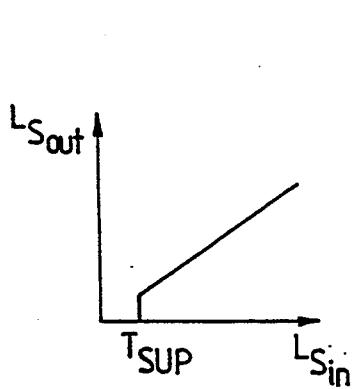
FIG. 2 shows a transfer function of a nonlinear processor.

As the schematical transfer function in FIG. 2 illustrates, the non-linear processor 27 only passes through signals exceeding a given threshold level $T_{SUP}$ and received at the port $S_{in}$ from the near end and blocks a passage of low-level signals. This has been realized in the embodiment of FIG. 1 in such a way that, on signal levels $L_{Sin}$ higher than the threshold value $T_{SUP}$, the change-over switch SW1 shunts (by-passes) the processor 27 by connecting the output signal of the filter 21 to the output port $S_{out}$ via the A-law converter 36, i.e. non-linear processing is not used. On signal levels $L_{Sin}$ lower than the threshold level $T_{SUP}$, the change-over switch SW1 connects the output signal of the filter 21 to the processor 27 for non-linear processing. Non-linear processing means that a passage of a signal is blocked in practice by attenuating the level of the signal passed through the processor 27 irrespective of the level of the input signal to a given low blocking level. For instance, the attenuation of the processor 27 is such that the residual echo at the port $S_{out}$ is smaller than −65 dBmO.

The change-over switch SW1 is controlled by the control unit 26 on the basis of the output level of the filter 21, which level is detected by a level detector 28, and of a signal level $L_{Rin}$ received at the port $R_{in}$, which level is detected by the level detector 25. The output level of the filter 21 represents in this case the signal level $L_{Sin}$ received at the port $S_{in}$ from the near end. On the other hand, the signal level $L_{Rin}$ is equal to the level of the far end signal transmitted over the port $R_{out}$ to the near end (and to the echo path), which level causes an echo signal at the port $S_{in}$.

FIG. 2 illustrates how the non-linear processor 27 is connected between two operating modes depending on the signal levels $L_{Rin}$ and $L_{Sin}$. The $L_{Rin}$, $L_{Sin}$ level is subdivided into two ranges, W and Z. Within the range W the processor 27 is switched off (shunted) and within the range Z the processor 27 is on. A condition for a proper operation of non-linear processing within both ranges is a correct detection of double talk (both ends are talking) and near end talk.

Figure 3:
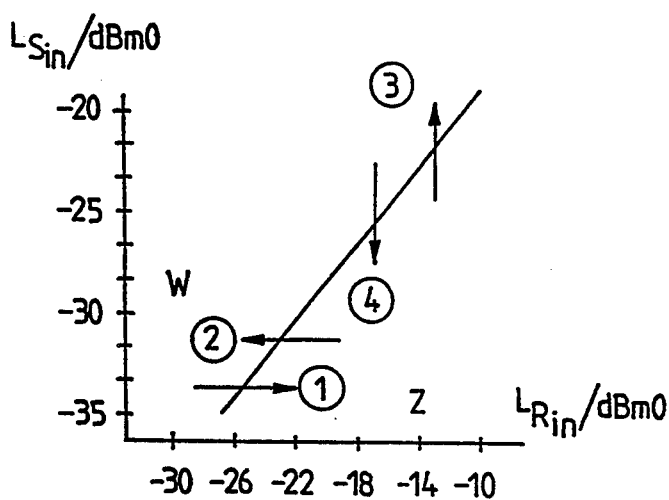
FIG. 3 shows a change in operating modes of the non-linear processor as a function of signal levels $L_{Sin}$ and $L_{Rin}$.

The dynamic properties of non-linear processing are determined on the basis of the time periods needed for transitions between the ranges W and Z according to the four transition alternatives 1 to 4 shown in FIG. 3.

Transition 1 from W to Z.

In this case $L_{Sin}$ occurs at first and is constant, while $L_{Rin}$ rises so high that the non-linear processor 27 is switched on. Since this causes distortion in the speech signal y(i) of the near end, the transition must not be carried out too quickly.

Transition 2 from Z to W.

In this case $L_{Rin}$ has exceeded the level $L_{Sin}$ (constant) and the non-linear processor 27 is on. After that $L_{Rin}$ falls. The non-linear processor 27 shall be on long enough to eliminate the echo still existing on the echo path.

Transition 3 from Z to W.

This transition occurs in the case of double talk. The non-linear processor 27 shall be switched off as soon as possible after double talk has been observed in order that the near end speech would not be distorted.

Transition 4 from W to Z.

In this case $L_{Rin}$ is constant and $L_{Sin}$ detected, but falling. Transition 4 shall favour the continuity of the signal y(i) in order that it would not be distorted.

An elimination or reduction of disturbances during the transitions 2 and 3 is provided according to the invention in such a way that an attenuation $A_{NLP}$ of the non-linear processor 27 is reduced ramp-like, preferably linearly, from the maximum value MAX to the minimum value MIN (the signal level at the port $S_{out}$ rises ramp-like to the threshold level $T_{SUP}$, respectively) during a given time period $T_1$ counted from the moment at which $L_{Sin}$ again exceeds the threshold level $T_{SUP}$ or a double talk situation is detected, as illustrated in FIGS. 4A and 4B. FIGS. 4C and 4D show a similar situation with a sudden stepwise change in attenuation without the ramp of the time period $T_1$ according to the invention. The time $T_1$ can be for instance 100 milliseconds.

In another embodiment of the invention is additionally employed a special guard period $T_2$ from the moment at which $L_{Sin}$ exceeds the threshold level $L_{SUP}$ to the start of the ramp-like attenuation $A_{NLP}$ and the change in the level of the signal passed through, as illustrated in FIGS. 5A and 5B. In the case of double talk, the guard period $T_2$ is not used. The guard period $T_2$ prevents, for instance, a passage of momentary echo peaks over the non-linear processor 27 to the far end. FIGS. 5C and 5D illustrate the situation in which the guard period $T_2$ according to the invention and the "smoothening ramp" $T_1$ are not used.

FIG. 6 illustrates a prevention of disturbance in a situation according to transition 4 when the non-linear processor 27 is switched on. The threshold level $T_{SUP}$ ranges within a level range from −35 dBmO to −40 dBmO, in the example case the level is −36 dBmO, which is so low that it is not possible in practice to hear the switching on of the non-linear processor 27 in the telephone channel. A quick change from a lower threshold level would cause an audible disturbance in the telephone channel.

The threshold level $T_{SUP}$ may also be adaptive to the echo path, for instance as follows: $T_{SUP} = -L_{Rin} - (18 \pm 3)$dB.

In the preferred embodiment of the invention, all the blocks shown in FIG. 1 are realized by software in a digital signal processor.

The invention has above been described in connection with certain exemplifying echo canceller types and digital transversal filters. The method of the invention can, however, be applied to all echo cancellers.

The figures and the description relating to them are only intended to illustrate the present invention. As to the details, the method of the invention can vary within the scope of the attached claims.

I claim:

1. A method for non-linear signal processing in an echo canceller, comprising:
   (a) measuring a level of a first end signal entering and passing through an echo canceller from a first end of a transmission connection on its way to a second end of the transmission connection;
   (b)(i) attenuating the level of said first end signal passing through said echo canceller to a predetermined blocking level when the level measured in step (a) is lower than a given threshold level, and
   (b)(ii) ramping-up the level of said first end signal passing through said echo canceller from said blocking level to a normal, unattenuated level, during a predetermined time interval, when the level measured in step (a) again exceeds said given threshold level, or a double talk situation is detected.

2. The method of claim 1, wherein:
said given threshold level is a fixed threshold level within the range from 35 to 40 dBmO.

3. The method of claim 1, further comprising:
adaptively determining said given threshold level depending on said level measured in step (a).

4. The method of claim 1, further comprising:
between steps (b)(i) and (b)(ii) delaying beginning of said ramping-up, from when the level measured in step (a) again exceeds said given threshold level, for a guard .period having a predetermined duration.

5. The method of claim 4, wherein:
said given threshold level is a fixed threshold level within the range from 35 to 40 dBmO.

6. The method of claim 4, further comprising:
adaptively determining said given threshold level depending on said level measured in step (a).

7. The method of claim 4, wherein:
said predetermined duration of said guard period is about 80 milliseconds.

8. The method of claim 7, wherein:
said given threshold level is a fixed threshold level within the range from 35 to 40 dBmO.

9. The method of claim 7, further comprising:
adaptively determining said given threshold level depending on said level measured in step (a).

10. The method of claim 1, wherein:
said predetermined time interval of step (b)(ii) is about 100 milliseconds.

11. The method of claim 10, wherein:
said given threshold level is a fixed threshold level within the range from 35 to 40 dBmO.

12. The method of claim 10, further comprising:
adaptively determining said given threshold level depending on said level measured in step (a) .

13. The method of claim 1, wherein:
in step (b)(ii), said first end signal passing through said echo canceller is ramped up linearly.

14. The method of claim 1, further comprising:
continually monitoring said transmission connection looking for occurrence of a double talk situation.

* * * * *